(12) United States Patent
Penugonda et al.

(10) Patent No.: US 9,125,040 B1
(45) Date of Patent: Sep. 1, 2015

(54) NOTIFICATION SYSTEM AND NOTIFICATION DISTRIBUTION METHOD TO DISTRIBUTE NOTIFICATION COMMUNICATIONS

(71) Applicant: Sprint Communications Company L.P., Overland Park, KS (US)

(72) Inventors: Srinivasarao V. N. S. Penugonda, Overland Park, KS (US); Feng Xie, Leawood, KS (US); Manikandan Ramanujam, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/218,162

(22) Filed: Mar. 18, 2014

(51) Int. Cl.
*H04M 11/04* (2006.01)
*H04W 4/22* (2009.01)

(52) U.S. Cl.
CPC .................................... *H04W 4/22* (2013.01)

(58) Field of Classification Search
CPC ....... H04W 4/22; H04W 76/007; H04W 4/06; H04W 4/14; H04W 4/12; H04W 72/005; H04W 64/003; H04W 4/021; H04W 88/02; H04W 4/18; H04W 4/206; H04W 8/20; H04W 36/28; H04W 4/028; H04W 76/002
USPC ............................................... 455/404.2
See application file for complete search history.

(56) References Cited

U.S. PATENT DOCUMENTS

| 6,842,628 | B1* | 1/2005 | Arnold et al. ............. 455/556.2 |
| 8,483,654 | B2 | 7/2013 | Levinson et al. |
| 2009/0248828 | A1* | 10/2009 | Gould et al. .................. 709/207 |
| 2012/0231795 | A1* | 9/2012 | Witzel .......................... 455/436 |

* cited by examiner

*Primary Examiner* — Kwasi Karikari

(57) ABSTRACT

A notification system and notification distribution method to distribute notification communications are provided. The notification system in one example includes a plurality of wireless communication devices (WCDs) configured to transfer a corresponding plurality of subscriber profiles and plurality of WCD locations to a notification distribution system, and the notification distribution system configured to receive the plurality of subscriber profiles and the plurality of WCD locations for the plurality of WCDs, receive a notification communication, with the notification communication including at least a notification type, a notification location, and a notification data, filter the plurality of WCDs by comparing the notification communication to the plurality of subscriber profiles and the plurality of WCD locations and select one or more WCDs to receive the notification communication, and multi-cast the notification communication to the one or more selected WCDs.

20 Claims, 6 Drawing Sheets

NOTIFICATION SYSTEM AND NOTIFICATION DISTRIBUTION METHOD TO DISTRIBUTE NOTIFICATION COMMUNICATIONS

TECHNICAL BACKGROUND

Many tasks require coordination between multiple persons to accomplish. In addition, some tasks may require an immediate response by all appropriate response personnel. The task may require that responders arrive quickly to a designated location and be prepared for the task.

One task that typically requires a fast an accurate notification of a variety of personnel is an emergency situation. In an emergency situation, multiple types of emergency personnel may need to be notified and the notified personnel may need to receive all available information in order to properly assess and handle the situation. For example, in a gas line break situation, many persons may need to be notified, such as pipeline maintenance personnel. In addition, it may be necessary to inform fire personnel to be present in case of fire, and police may need to be informed in order to evacuate a surrounding area. In other scenarios, fewer personnel and fewer types of personnel may need to be informed. Alternatively, in some scenarios it may be of importance to determine which personnel are closest to the scene or event, so as to determine the appropriate personnel to be notified and to respond.

Notification systems exist that issue notifications to emergency personnel. However, providing notifications to personnel who are not needed can be counter-productive in some situations.

OVERVIEW

A notification system and notification distribution method to distribute notification communications are provided. The notification system in one example includes a plurality of wireless communication devices (WCDs) configured to transfer a corresponding plurality of subscriber profiles and plurality of WCD locations to a notification distribution system, and the notification distribution system configured to receive the plurality of subscriber profiles and the plurality of WCD locations for the plurality of WCDs, receive a notification communication, with the notification communication including at least a notification type, a notification location, and a notification data, filter the plurality of WCDs by comparing the notification communication to the plurality of subscriber profiles and the plurality of WCD locations and select one or more WCDs to receive the notification communication, and multi-cast the notification communication to the one or more selected WCDs.

DETAILED DESCRIPTION

Figure 1:
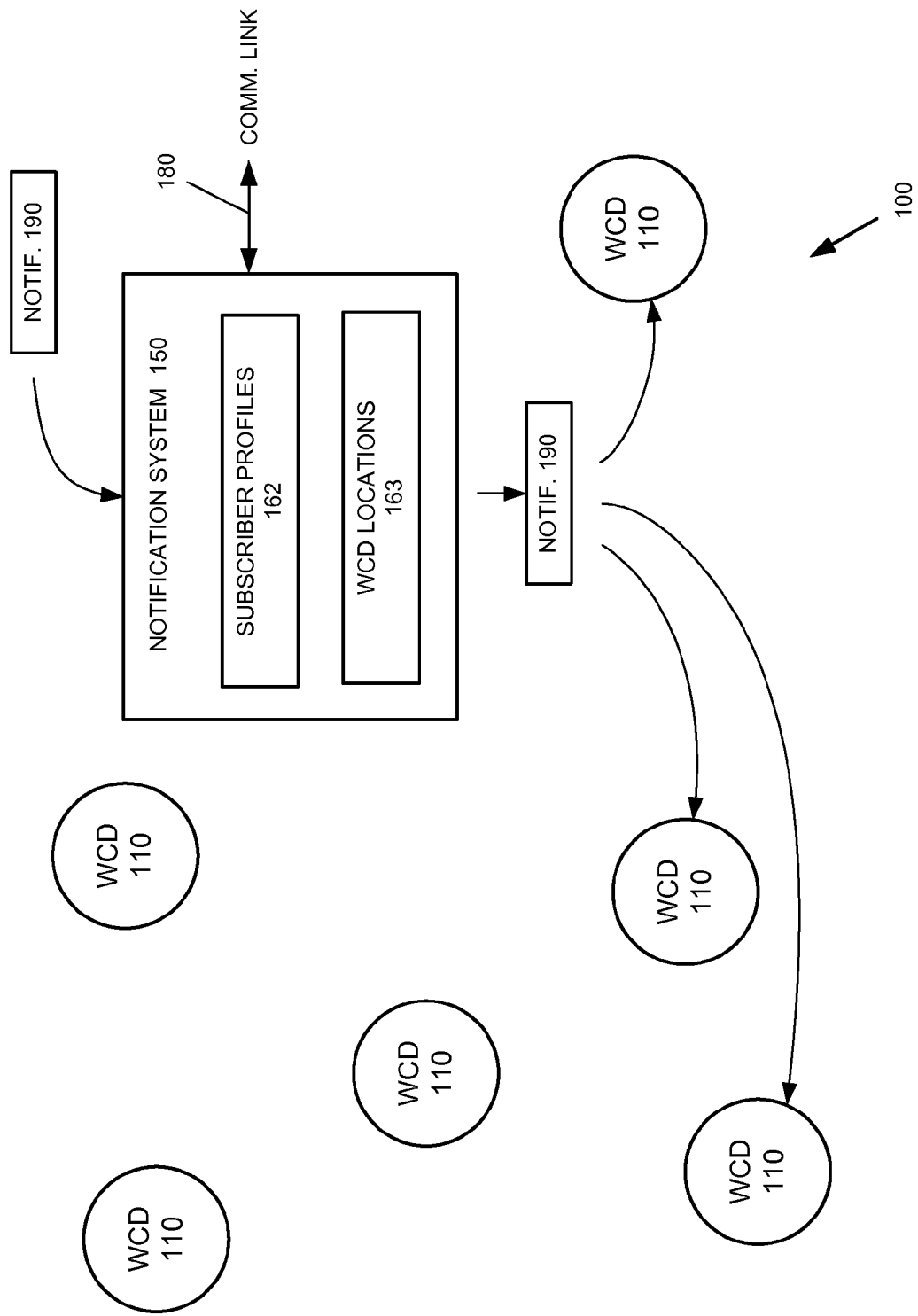
FIG. 1 illustrates a notification system to distribute notification communications.

FIG. 1 illustrates a notification system 100 to distribute notification communications. The notification system 100 includes a plurality of Wireless Communication Devices (WCDs) 110 and a notification distribution system 150. The WCDs 110 comprise communication devices of subscribers, where the subscribers are subscribed to the notification service of the notification distribution system 150. The notification distribution system 150 comprises computer and communication circuitry, data storage equipment, and associated software/hardware components. The notification distribution system 150 can be connected to a Public Safety Answering Point (PSAP) or other emergency communication networks or devices. The notification distribution system 150 communicates wireless with the plurality of WCDs 110 in some examples. The notification distribution system 150 is configured to receive notification communications and distribute the notification communication to appropriate WCDs 110. The notification distribution system 150 is configured to filter the WCDs 110 and determine which subscribers and WCDs 110 are suitable for receiving a particular notification communication.

The plurality of WCDs 110 are configured to transfer a corresponding plurality of subscriber profiles and plurality of WCD locations to the notification distribution system 150. Each subscriber profile comprises rules or conditions that specify which notification communications the subscriber wishes to receive in the subscriber's WCD 110. Each WCD 110 provides a subscriber profile to the notification distribution system 150. The notification distribution system 150 maintains a library of subscriber profiles 151 comprising received subscriber profiles. A WCD 110 can transfer its subscriber profile to the notification distribution system 150 at various times, such as during an initial subscription procedure, at periodic intervals, or whenever the subscriber profile of the WCD 110 changes. The WCD 110 could be a telephone, computer, media player, gaming apparatus, internet appliance, or some other machine capable of interfacing with LTE and IMS systems. The WCD 110 comprises computer and communication circuitry, data memory, and associated software/hardware components.

Each WCD 110 provides its location to the notification distribution system 150. The notification distribution system 150 maintains a library of WCD locations 152 comprising received WCD locations. A WCD 110 can transfer its location to the notification distribution system 150 at various times, such as power-up of the WCD 110, at periodic intervals, or whenever the location of the WCD 110 substantially changes. If a WCD 110 is moving, the WCD 110 can transfer frequent location updates to the notification distribution system 150.

In operation, the notification distribution system 150 receives a notification communication 190. The notification distribution system 150 selects appropriate subscribers and associated WCDs 110 for the notification communication 190 and distributes the notification communication 190 to the selected WCDs 110. The notification distribution system 150 can receive and distribute multiple notification communications, including simultaneously receiving and distributing multiple notification communications.

The selected WCDs 110 can comprise some or all of the available WCDs 110. The selected WCDs 110 in some examples are selected according to their subscription profiles. The selected WCDs 110 in some examples are selected according to subscribers' shift times or on-call times (or other availability conditions), according to a notification type, according to a notification level, or according to a maximum distance to the notification location. However, it should be understood that other or additional subscriber selection criteria are contemplated and are within the scope of the description and claims.

The notification communication 190 includes information including at least a notification type, a notification location (i.e., the location where the notification communication 190 originates), and a notification data. The notification type indicates a type of notification communication, including medical, fire, accident, criminal, weather, and public infrastructure notification types, for example. It should be understood that the notification type can include other or additional notification types. The notification level indicates a severity associated with the notification type. For example, a fire notification type can include notification levels relating to the number and types of fire-fighting personnel needed, a fire spreading danger, a chemical or flammable material presence, and other or additional factors. The notification data comprises data to be provided to the selected WCDs 110. The notification data includes information obtained from the notification communication or comprises information supplied by the notification distribution system 150. The notification data comprises information that will be helpful or necessary to the selected WCDs 110. The notification data in some examples includes responder types being notified, WCD locations of the selected one or more WCDs, needed response equipment, needed response personnel, scope of an affected area, medical info regarding victims, and the number/age/sex of victims. It should be understood that additional notification data is contemplated and is within the scope of the description and claims.

The notification distribution system 150 can receive the notification communication 190 from any source, such as from a subscriber WCD or from a non-subscriber WCD. Alternatively, or in addition, the notification distribution system 150 is coupled to one or more external communication networks via a communication link 180 and receives notification communications from external networks or sources. The one or more other communication networks include other wireless networks, the Public Switched Telephone Network (PSTN), and IP networks, such as the Internet, or other external networks or devices. The communication link 180 comprises metal, glass, plastic, air, space, and the like. The communication link 180 in some examples propagates electromagnetic signals that utilize various protocols, such as LTE, Internet Protocol (IP), Ethernet, Session Initiation Protocol (SIP), Diameter, Real-time Transfer Protocol (RTP), and/or some other format—including combinations thereof. The communication link 180 may include intermediate devices, systems, and networks.

In some examples, the notification distribution system 150 is configured to receive the plurality of subscriber profiles and the plurality of WCD locations from the plurality of WCDs 110, receive a notification communication 190, with the notification communication 190 including at least a notification type, a notification location, and a notification data, filter the plurality of WCDs 110 by comparing the notification communication 190 to the plurality of subscriber profiles 151 and the plurality of WCD locations 152 and select one or more WCDs 110 to receive the notification communication 190, and multi-cast the notification communication 190 to the one or more selected WCDs 110.

The notification distribution system 150 in some examples pushes subscriber contact information to all of the selected subscribers and associated WCDs 110. As a result, each selected WCD 110 receives contact information for all of the other selected WCDs 110, wherein the selected WCDs 110 can communicate directly, such as for coordinating response efforts.

The notification distribution system 150 in some examples notifies the selected WCDs 110 to directly exchange communications. As a result, communications can be exchanged directly between the selected WCDs 110, without the notification distribution system 150 having to relay communications between the individual WCDs 110. The traffic loading and congestion of the notification distribution system 150 is thereby reduced.

The subscribers in some examples comprise emergency responders and a notification communication can comprise an emergency notification communication. Alternatively, the subscribers comprise other types of responders, such as public utilities personnel, security personnel, medical personnel, fire personnel, and the like.

Figure 2:
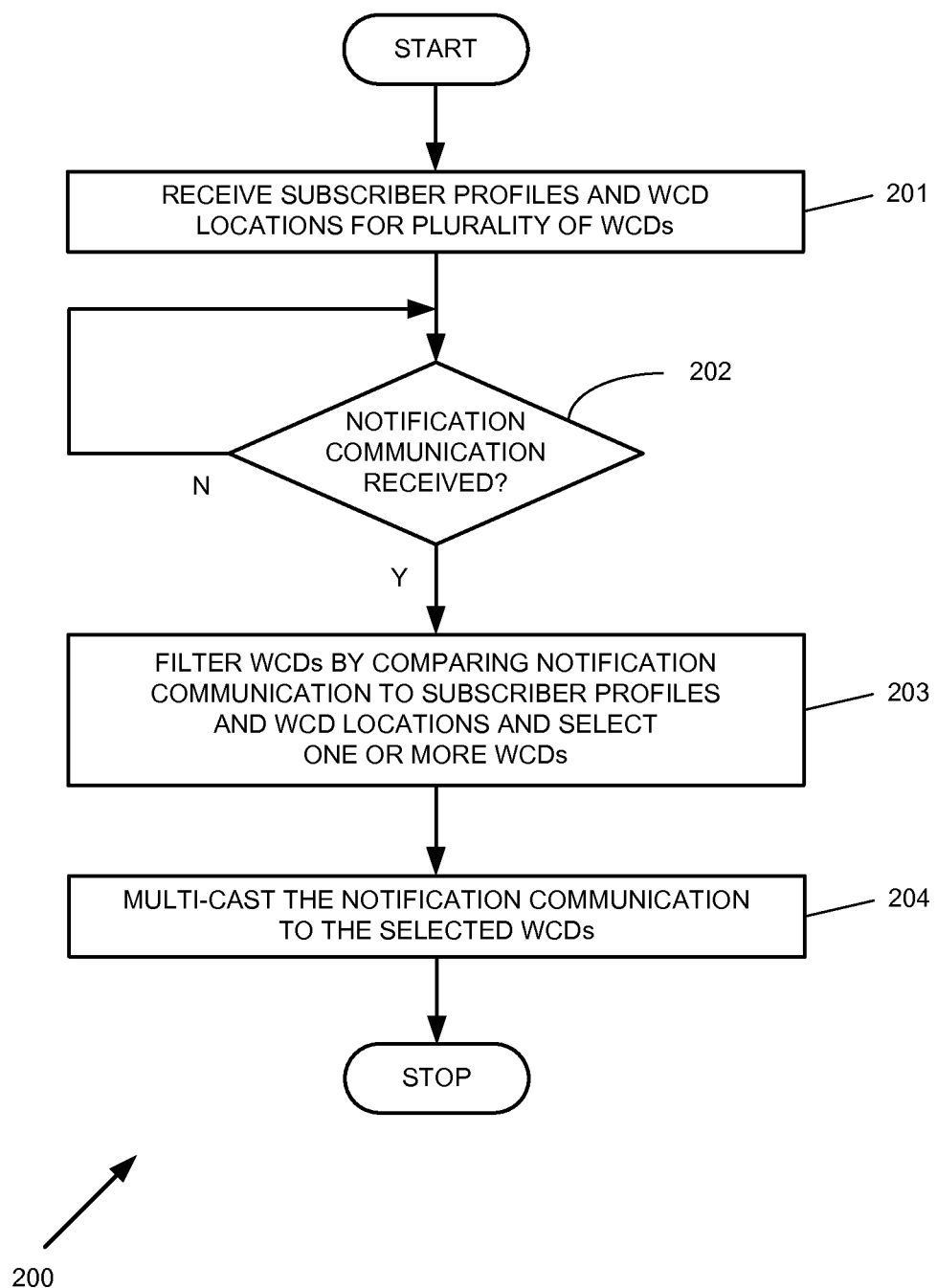
FIG. 2 illustrates a flowchart of a notification distribution method to distribute notification communications.

FIG. 2 illustrates a flowchart 200 of a notification distribution method to distribute notification communications. In step 201, a notification distribution system receives subscriber profiles and WCD locations for a plurality of WCDs. The subscriber profiles and WCD locations in some examples are received at specific times, such as during a WCD subscription process, at power-up of a WCD, or at a change in status or operation of a WCD. Alternatively, or in addition, the subscriber profiles and WCD locations are received whenever either a particular WCD has a change in its subscriber profile or has a change in its location.

In step 202, the notification distribution system determines whether a notification communication has been received. If a notification communication has been received, the method proceeds to step 203. Otherwise, the method loops back and waits for a notification communication.

In step 203, where a notification communication has been received, the notification distribution system filters available WCDs by comparing the notification communication to subscriber profiles and WCD locations. As a result, the notification distribution system selects one or more WCDs to receive the notification communication.

In step 204, the notification distribution system multi-casts the notification communication to the selected one or more WCDs.

Figure 3:
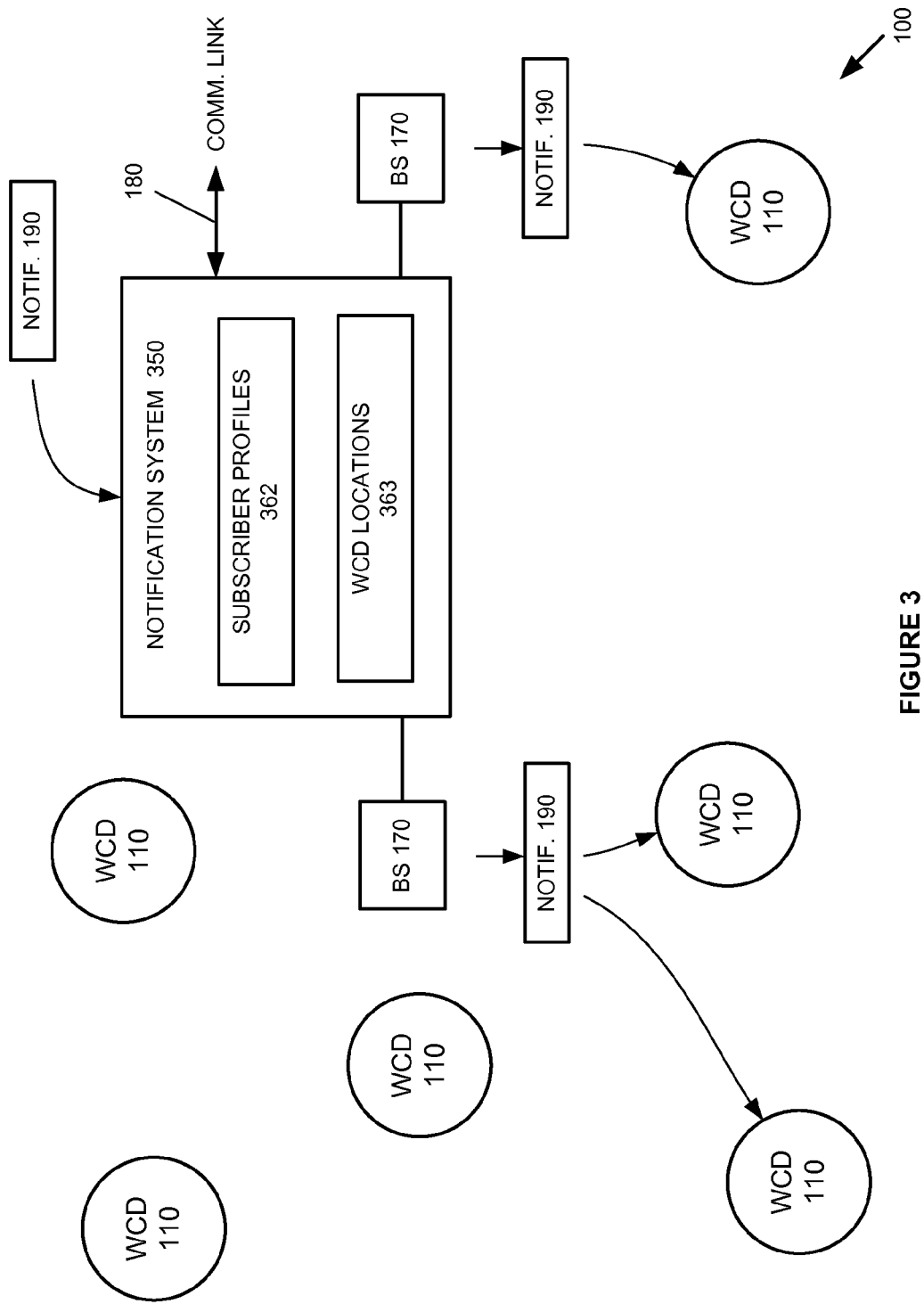
FIG. 3 illustrates a notification system to distribute notification communications.

FIG. 3 illustrates a notification system 300 to distribute notification communications. The notification system 300 includes a plurality of WCDs 110, a notification distribution system 350, and one or more Base Stations (BSs) 170. The notification distribution system 350 of FIG. 3 is an example of the notification distribution system 150, although the notification distribution system 350 of FIG. 3 maybe the same as or different from the notification distribution system 150 of FIG. 1. The notification distribution system 350 is coupled to the one or more BSs 170 and exchanges communications with the one or more BSs 170. The one or more BSs 170 comprise wireless BSs that wirelessly exchange communications with the plurality of WCDs 110. The BSs 170 comprise computer and communication circuitry, data storage equipment, and associated software/hardware components. The BSs 170 in some examples comprise wireless BSs, Base Transceiver Stations (BTSs), e Node Bs (eNBs), or other suitable communication systems or devices. The WCDs 110 comprise communication devices of subscribers, where the subscribers are subscribed to the notification service of the notification distribution system 350. The notification distribution system 350 is configured to receive notification communications and distribute the notification communication to appropriate WCDs 110 via the one or more BSs 170. The notification distribution system 350 is configured to filter the WCDs 110 and determine which subscribers and WCDs 110 are suitable for receiving a particular notification communication.

The plurality of WCDs 110 are configured to transfer a corresponding plurality of subscriber profiles and plurality of WCD locations to the notification distribution system 350 via the one or more BSs 170. Each subscriber profile comprises rules or conditions that specify which notification communications the subscriber wishes to receive in the subscriber's WCD 110. Each WCD 110 provides a subscriber profile to the notification distribution system 350. The notification distribution system 350 maintains a library of subscriber profiles 351, with the library of subscriber profiles 351 comprising received subscriber profiles. A WCD 110 can transfer its subscriber profile to the notification distribution system 350 at various times, such as during an initial subscription procedure, at periodic intervals, or whenever the subscriber profile of the WCD 110 changes.

Each WCD 110 provides its location to the notification distribution system 350 via the one or more BSs 170. The notification distribution system 350 maintains a library of WCD locations 352, with the library of WCD locations 352 comprising received WCD locations. A WCD 110 can transfer its location to the notification distribution system 350 at various times, such as power-up of the WCD 110, at periodic intervals, or whenever the location of the WCD 110 substantially changes. If a WCD 110 is moving, the WCD 110 can transfer frequent location updates to the notification distribution system 350.

In operation, the notification distribution system 350 receives a notification communication 190. The notification distribution system 350 selects appropriate subscribers and associated WCDs 110 for the notification communication 190 and distributes the notification communication 190 to the selected WCDs 110. The notification distribution system 350 can receive and distribute multiple notification communications, including simultaneously receiving and distributing multiple notification communications.

The selected WCDs 110 can comprise some or all of the available WCDs 110. The selected WCDs 110 in some examples are selected according to their subscription profiles. The selected WCDs 110 in some examples are selected according to being on-shift, being on-call, or being otherwise available, accepting an appropriate notification type, accepting an appropriate notification level, or a maximum distance to the notification location. However, it should be understood that other or additional subscriber selection criteria are contemplated and are within the scope of the description and claims.

The notification communication 190 includes information including at least a notification type, a notification location (i.e., the location where the notification communication 190 originates), and a notification data.

The notification type indicates a type of notification communication, including medical, fire, accident, criminal, weather, and public infrastructure notification types, for example. It should be understood that the notification type can include other or additional notification types.

The notification level indicates a severity associated with the notification type. For example, a fire notification type can include notification levels relating to the number and types of fire-fighting personnel needed, a fire spreading danger, a chemical or flammable material presence, and other or additional factors.

The notification data comprises data to be provided to the selected WCDs 110. The notification data includes information obtained from the notification communication or comprises information supplied by the notification distribution system 350. The notification data comprises information that will be helpful or necessary to the selected WCDs 110. The notification data in some examples includes responder types being notified, WCD locations of the selected one or more WCDs, needed response equipment, needed response personnel, scope of an affected area, medical info regarding victims, and the number/age/sex of victims. It should be understood that additional notification data is contemplated and is within the scope of the description and claims.

The notification distribution system 350 can receive the notification communication 190 from any source, such as from a BS 170, from a subscriber WCD, or from a non-subscriber WCD. Alternatively, or in addition, the notification distribution system 350 is coupled to one or more external communication networks via a communication link 180 and receives notification communications from external networks or sources. The one or more other communication networks include other wireless networks, the Public Switched Telephone Network (PSTN), and IP networks, such as the Internet, or other external networks or devices.

In some examples, the notification distribution system 350 is configured to receive the plurality of subscriber profiles and the plurality of WCD locations from the plurality of WCDs 110, receive a notification communication 190, with the notification communication 190 including at least a notification type, a notification location, and a notification data, filter the plurality of WCDs 110 by comparing the notification communication 190 to the plurality of subscriber profiles 351 and the plurality of WCD locations 352 and select one or more WCDs 110 to receive the notification communication 190, and multi-cast the notification communication 190 to the one or more selected WCDs 110.

The notification distribution system 350 therefore filters the available WCDs 110 for appropriate notification subscribers when a notification communication is received by the notification distribution system 350. The notification distribution system 350 compares a notification communication to the notification types, notification levels, time availabilities, and locations/distances that are specified for each subscriber in the subscriber profiles 351. The notification distribution system 350 selects one or more subscribers as a result of the comparison.

The notification distribution system 350 in some examples pushes subscriber contact information to all of the selected subscribers and associated WCDs 110. As a result, each selected WCD 110 receives contact information for all of the other selected WCDs 110, wherein the selected WCDs 110 can communicate directly, such as for coordinating response efforts.

The subscribers in some examples comprise emergency responders and a notification communication can comprise an emergency notification communication. Alternatively, the subscribers comprise other types of responders, such as public utilities personnel, security personnel, medical personnel, fire personnel, and the like.

Figure 4:
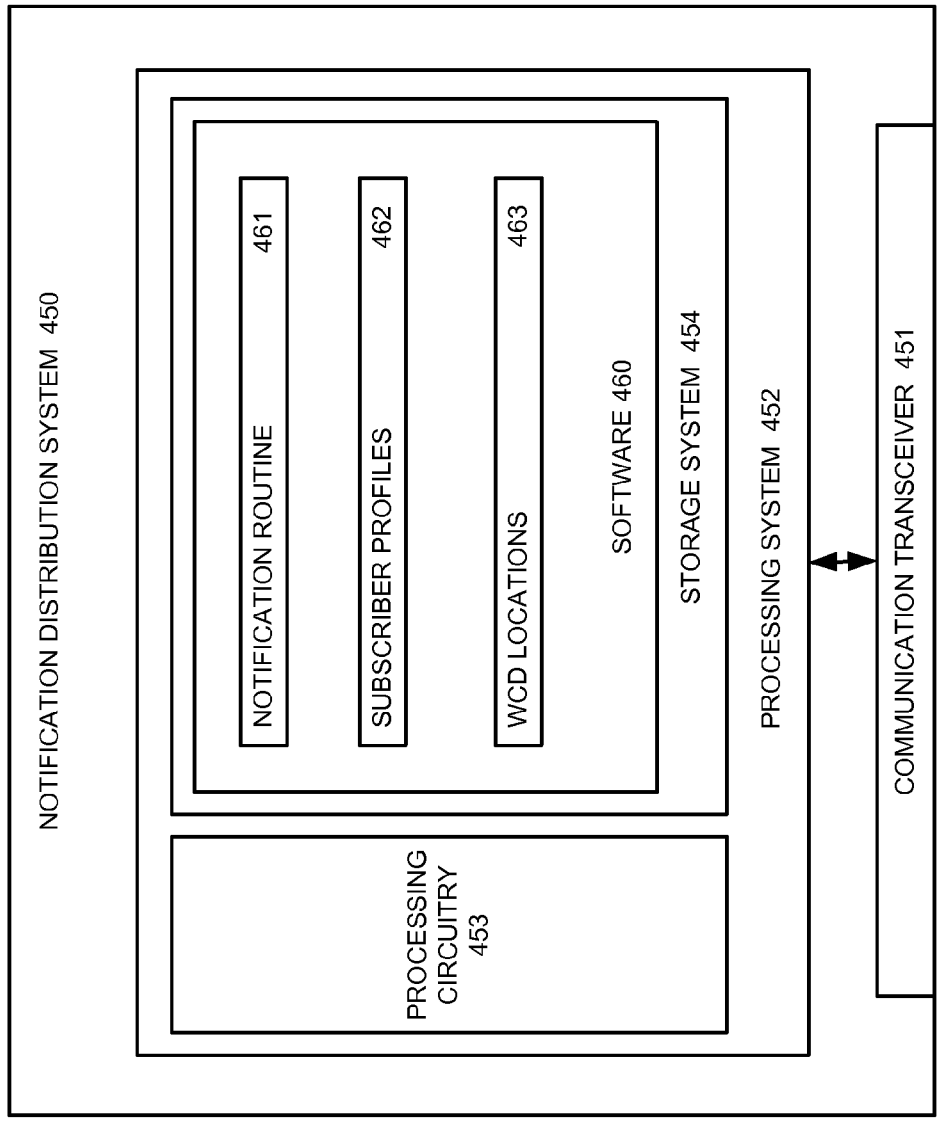
FIG. 4 illustrates a notification distribution system to distribute notification communications.

FIG. 4 illustrates a notification distribution system 450 to distribute notification communications. The notification distribution system 450 is an example of systems 150 and 350, although these systems may use alternative configurations and operations. The notification distribution system 450 comprises a processing system 452 coupled to a communication transceiver 451. The processing system 452 comprises processing circuitry 453 and a storage system 454. The storage system 454 stores software 460. The software 460 includes software modules 461-463. Some conventional aspects of the notification distribution system 450 are omitted for clarity, such as power supplies, enclosures, and the like. The notification distribution system 450 may be centralized or distributed and may include various virtualized components.

In the processing system 452, the processing circuitry 453 comprises circuit boards, integrated circuitry, and associated electronics. The storage system 454 comprises non-transitory, machine-readable, data storage media, such as flash drives, disc drives, memory circuitry, servers, and the like. The software 460 comprises machine-readable instructions that control the operation of the processing circuitry 453 when executed. The software 460 includes the software modules 461-463 and may also include operating systems, applications, utilities, databases, and the like. All or portions of the software 460 may be externally stored on one or more storage media, such as flash drives, discs, servers, and the like.

When executed by the processing circuitry 453, the notification routine module 461 directs the processing circuitry 453 to receive the plurality of subscriber profiles and the plurality of WCD locations for the plurality of WCDs, receive a notification communication, with the notification communication including a notification type, a notification location, and a notification data, filter the plurality of WCDs by comparing the notification communication to the plurality of subscriber profiles and the plurality of WCD locations and select one or more WCDs to receive the notification communication, and multi-cast the notification communication to the one or more selected WCDs. When executed by the processing circuitry 453, the subscriber profiles module 462 directs the processing circuitry 453 to store and retrieve subscriber profiles associated with WCDs. When executed by the processing circuitry 453, the WCD locations module 463 directs the processing circuitry 453 to store and retrieve WCD locations of the associated WCDs.

The communication transceiver 451 comprises communication components, such as ports, signal processing circuitry, memory, software, and the like. The communication transceiver 451 receives subscriber profiles and WCD locations from WCDs. The communication transceiver 451 receives notification communications to be distributed. The communication transceiver 451 multi-casts notification communications to selected WCDs.

Figure 5:
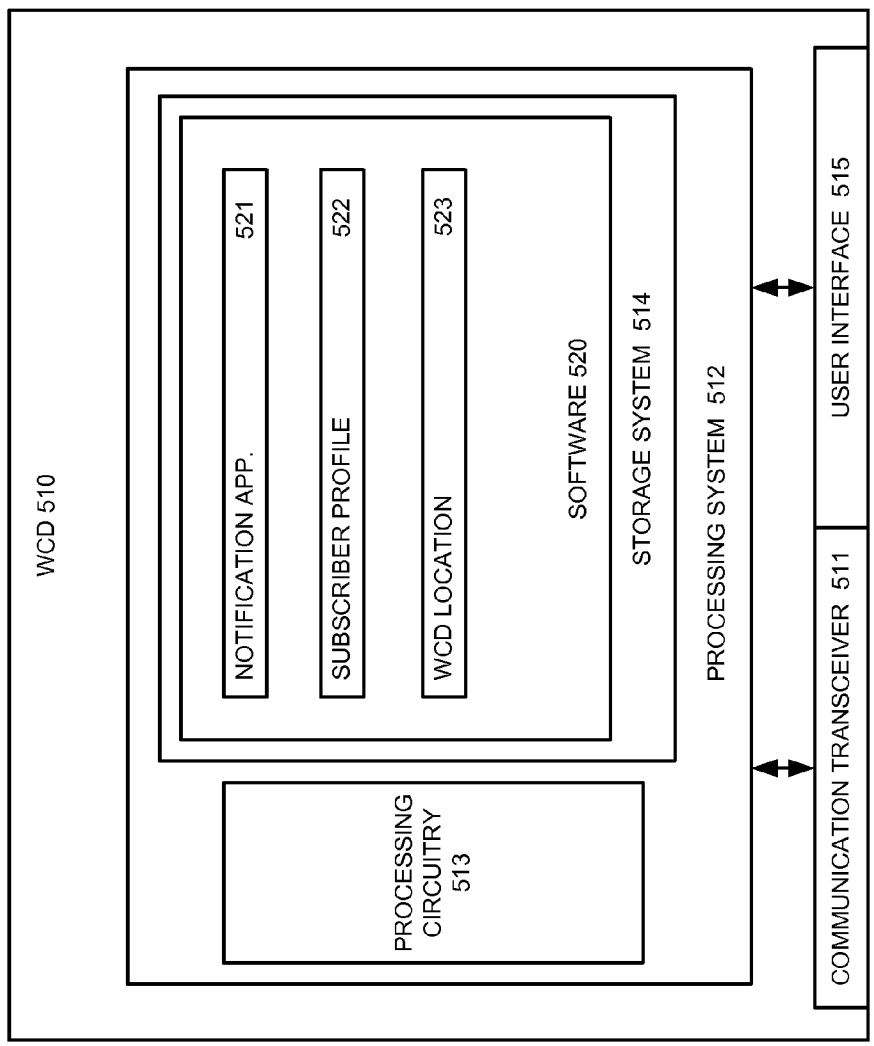
FIG. 5 illustrates a WCD to distribute notification communications.

FIG. 5 illustrates a WCD 510 to distribute notification communications. The WCD 510 is an example of the WCDs 110, although these systems may use alternative configurations and operations. The WCD 510 comprises a processing system 512 coupled to a communication transceiver 511 and coupled to a user interface 515. The processing system 512 comprises processing circuitry 513 and a storage system 514. The storage system 514 stores software 520. The software 520 includes software modules 521-523. Some conventional aspects of the WCD 510 are omitted for clarity, such as power supplies, enclosures, and the like.

The user interface 515 comprises displays, touch sensors, speakers, microphones, and the like. The user interface 515 receives user inputs to generate or modify the subscriber profile 522. The user interface 515 presents notification communications received from a notification distribution system.

In the processing system 512, the processing circuitry 513 comprises circuit boards, integrated circuitry, and associated electronics. The storage system 514 comprises non-transitory, machine-readable, data storage media, such as flash drives, disc drives, memory circuitry, servers, and the like. The software 520 comprises machine-readable instructions that control the operation of the processing circuitry 513 when executed. The software 520 includes the software modules 521-523 comprising a notification application 521, a subscriber profile 522, and a WCD location 523. The software 520 may also include operating systems, applications, utilities, databases, and the like. All or portions of the software 520 may be externally stored on one or more storage media, such as flash drives, discs, servers, and the like.

In the wireless communication system 100, the WCD 510 includes and executes a notification application (app) 521. The user of the WCD 510 (i.e., the notification system subscriber) can install the notification application 521 for the purpose of subscribing to a notification system and receiving appropriate (i.e., filtered) notification communications. The user of the WCD 510 interacts with the notification application 521 to create the subscriber profile 522. The subscriber profile 522 comprises a set of selections that filter the notification communications that the user wishes to receive, wherein only some of the notification communications issued by a notification system will be received by the WCD 510.

The subscriber profile 522 includes rules or conditions regarding which notification communications the subscriber will receive. In one example, the subscriber profile 522 includes rules or conditions regarding the user's shift times or on-call times (or other availability conditions), an accepted notification type or types, an accepted notification level or levels, and a distance limitation of a maximum distance of the WCD 510 from a notification location. However, it should be understood that other or additional subscriber selection criteria are contemplated and are within the scope of the description and claims. As a result, the user of the WCD 110 configures the emergency notification application 521 to specify which emergency notifications the user wishes to receive.

When executed by the processing circuitry 513, the notification application module 521 directs the processing circuitry 513 to generate a subscriber profile for the subscriber associated with the WCD, with the subscriber profile including one or more of an accepted notification type and an accepted notification location distance, transfer the subscriber profile to the notification distribution system, transfer a WCD location of the WCD to the notification distribution system, and receive a notification communication from the notification distribution system, with the WCD being selected to receive the notification communication based on at least the notification type and notification location when compared to the subscriber profile and the WCD location. When executed by the processing circuitry 513, the subscriber profile module 522 directs the processing circuitry 513 to store and retrieve a subscriber profile associated with the WCD 510. When executed by the processing circuitry 513, the WCD location module 523 directs the processing circuitry 513 to store and retrieve a WCD location of the WCD 510.

The communication transceiver 511 comprises communication components, such as ports, signal processing circuitry, memory, software, and the like. The communication transceiver 511 transfers the subscriber profile 522 and the WCD location 523 to a notification distribution system. The communication transceiver 511 receives a notification communication from the notification distribution system.

Figure 6:
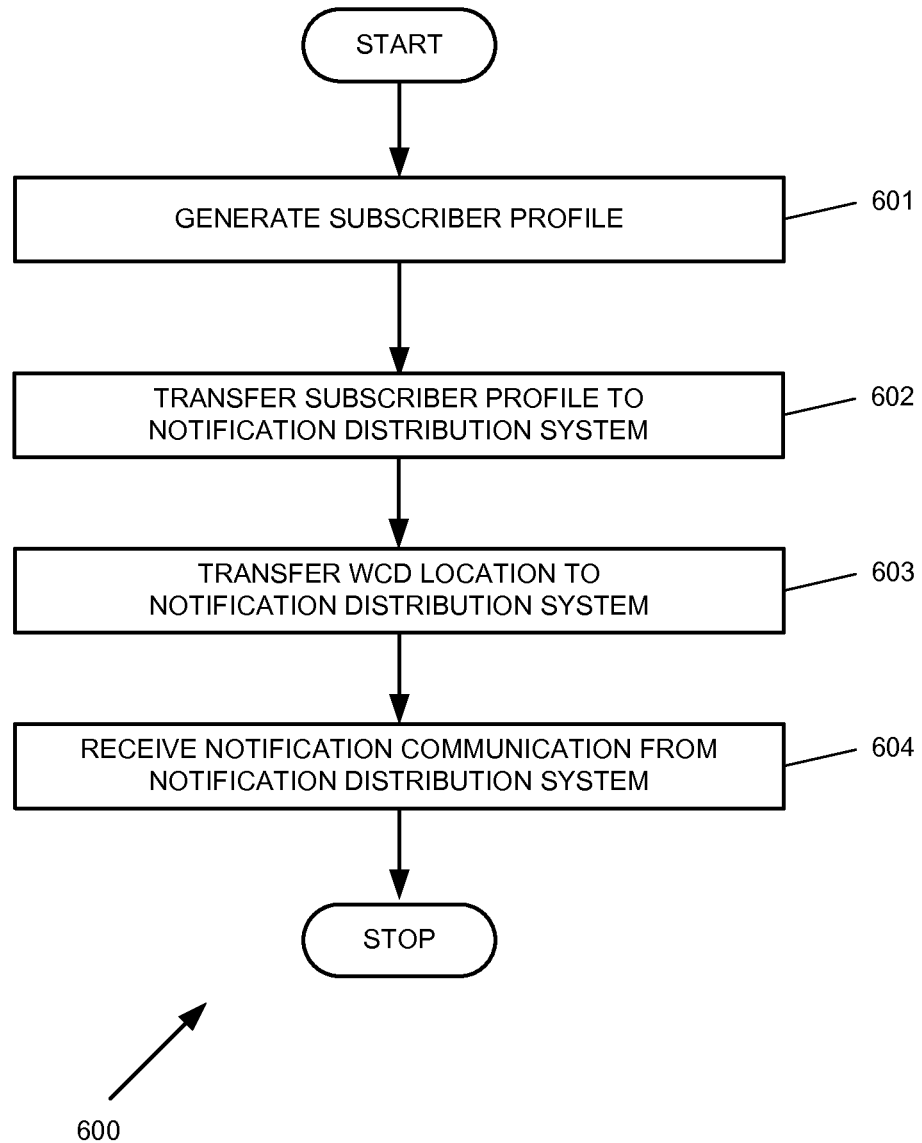
FIG. 6 illustrates a flowchart of a notification system operation of a WCD subscribed to the notification system.

FIG. 6 illustrates a flowchart 600 of a notification system operation of a WCD subscribed to the notification system. In step 601, the WCD, through actions of the associated subscriber, generates a subscriber profile. The subscriber profile comprises rules or conditions that specify which notification communications the subscriber will receive in the subscriber's WCD, as previously discussed. The subscriber profile includes rules or conditions such as shift times, on-call times, accepted notification types, accepted notification levels, and a maximum distance to a notification location. However, it should be understood that other or additional subscriber selection criteria are contemplated and are within the scope of the description and claims.

In step 602, the WCD transfers the subscriber profile to a notification distribution system. The WCD can transfer the subscriber profile to the notification distribution system when the subscriber profile is initially generated. In addition, the WCD can transfer the subscriber profile to the notification distribution system at any change in the subscriber profile, such as when a shift or on-call time of the subscriber has changed, for example.

In step 603, the WCD transfers the WCD location of the WCD to the notification distribution system. The WCD can transfer the WCD location to the notification distribution system whenever the WCD location substantially changes. The WCD can transfer the WCD location to the notification distribution system at periodic intervals. The WCD can transfer the WCD location to the notification distribution system when the WCD is powered-up. The WCD can transfer the WCD location to the notification distribution system at other times, as needed. It should be understood that the transfer of the WCD location may occur at various times to keep the notification distribution system informed of the WCD's current location.

In step 604, the WCD receives a notification communication from the notification distribution system. The notification communication is received as a consequence of the subscriber profile and the WCD location being used by the notification distribution system to select the WCD to receive the notification communication.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A notification system configured to distribute notification communications, comprising:
a plurality of wireless communication devices (WCDs) configured to transfer a corresponding plurality of subscriber profiles and plurality of WCD locations to a notification distribution system; and
the notification distribution system configured to receive the plurality of subscriber profiles and the plurality of WCD locations for the plurality of WCDs, receive a notification communication, with the notification communication including at least a notification type, a notification location, and a notification data, filter the one or more subscribers based on at least the notification type and the notification location associated with the notification communication and a notification level, filter the plurality of WCDs by comparing the notification communication to the plurality of subscriber profiles and the plurality of WCD locations and select one or more WCDs to receive the notification communication, and multi-cast the notification communication to the one or more selected WCDs.

2. The notification system of claim 1, with the notification distribution system further configured to filter the one or more subscribers based on a time-of-day (TOD).

3. The notification system of claim 1, with the notification distribution system further configured to filter the one or more subscribers based on WCD locations of the selected one or more WCDs.

4. The notification system of claim 1, with the notification communication multi-casted to the one or more selected WCDs including at least a notification type and a notification location.

5. The notification system of claim 1, with the notification communication multi-casted to the one or more selected WCDs including at least a notification type, a notification location, and WCD locations of the selected one or more WCDs.

6. The notification system of claim 1, with the notification distribution system further configured to push contact information to the selected one or more WCDs and notify the selected one or more WCDs to directly exchange communications.

7. The notification system of claim 1, with the notification distribution system coupled to one or more base stations (BSs) and with the notification distribution system exchanging communications with the plurality of WCDs via the one or more BSs.

8. The notification system of claim 1, with a WCD, comprising:
a communication transceiver configured to exchange communications; and
a processing system configured to generate a subscriber profile for the subscriber associated with the WCD, with the subscriber profile including one or more of an accepted notification type and an accepted notification location distance, transfer the subscriber profile to the notification distribution system, transfer a WCD location of the WCD to the notification distribution system, and receive a notification communication from the notification distribution system, with the WCD being selected to receive the notification communication based on at least the notification type and notification location when compared to the subscriber profile and the WCD location.

9. The notification system of claim 8, with the subscriber profile further including one or more of an accepted notification level and an accepted shift time and/or on-call time.

10. A notification distribution method to distribute notification communications, comprising:
in a notification distribution system, receiving for a plurality of wireless communication devices (WCDs) a corresponding plurality of subscriber profiles and plurality of WCD locations;
in the notification distribution system, receiving a notification communication, with the notification communication including at least a notification type, a notification location, and a notification data;
in the notification distribution system, filtering the one or more subscribers based on at least the notification type and the notification location associated with the notification communication and a notification level;
in the notification distribution system, filtering the plurality of WCDs by comparing the notification communication to the plurality of subscriber profiles and the plurality of WCD locations and selecting one or more WCDs to receive the notification communication; and
in the notification distribution system, multi-casting the notification communication to the one or more selected WCDs.

11. The method of claim 10, further comprising the notification distribution system filtering the one or more subscribers based on a time-of-day (TOD).

12. The method of claim 10, further comprising the notification distribution system filtering the one or more subscribers based on WCD locations of the selected one or more WCDs.

13. The method of claim 10, with the notification communication multi-casted to the one or more selected WCDs including at least a notification type and a notification location.

14. The method of claim 10, with the notification communication multi-casted to the one or more selected WCDs including at least a notification type, a notification location, and WCD locations of the selected one or more WCDs.

15. The method of claim 10, further comprising the notification distribution system pushing contact information to the selected one or more WCDs and notifying the selected one or more WCDs to directly exchange communications.

16. The method of claim 10, with the notification distribution system coupled to one or more base stations (BSs) and with the notification distribution system exchanging communications with the plurality of WCDs via the one or more BSs.

17. A Wireless Communication Device (WCD) configured to receive notification communications from a notification distribution system, comprising:

a communication transceiver configured to exchange communications; and a processing system configured to generate a subscriber profile for the subscriber associated with the WCD, with the subscriber profile including one or more of an accepted notification type, an accepted notification level, and an accepted notification location distance, transfer the subscriber profile to the notification distribution system, transfer a WCD location of the WCD to the notification distribution system, and receive a notification communication from the notification distribution system, with the WCD being selected to receive the notification communication based on at least the notification type, an accepted notification level, and notification location when compared to the subscriber profile and the WCD location.

18. The WCD of claim 17, with the subscriber profile further including an accepted shift time and/or on-call time.

19. The WCD of claim 17, with the notification communication received from the notification distribution system including at least a notification type and a notification location.

20. The WCD of claim 17, with the notification communication received from the notification distribution system including at least a notification type, a notification location, and WCD locations of the selected one or more WCDs.

\* \* \* \* \*